US008424267B2

(12) United States Patent  
Cannistraro et al.

(10) Patent No.: US 8,424,267 B2  
(45) Date of Patent: Apr. 23, 2013

(54) PROTECTIVE ASSEMBLY FOR IN-WALL PIPING, CONDUIT, AND WIRING

(75) Inventors: Vincent F. Cannistraro, Lincoln, MA (US); Thomas J. Kosik, Pelham, NH (US); David Duncanson, West Newbury, MA (US); Otto D. DeRuntz, Dunstable, MA (US)

(73) Assignee: Buildings and Matters, LLC, Lincoln, MA (US)

( * ) Notice: Subject to any disclaimer, the term of this patent is extended or adjusted under 35 U.S.C. 154(b) by 65 days.

(21) Appl. No.: 12/562,696

(22) Filed: Sep. 18, 2009

(65) Prior Publication Data

US 2010/0071293 A1 Mar. 25, 2010

Related U.S. Application Data

(63) Continuation-in-part of application No. 11/445,905, filed on Jun. 2, 2006, now abandoned.

(51) Int. Cl.
*E04C 2/52* (2006.01)
*E04B 1/19* (2006.01)

(52) U.S. Cl.
USPC ........ 52/745.2; 52/220.8; 52/220.1; 52/741.3

(58) Field of Classification Search .................. 52/220.1, 52/220.8, 712, 713, 698, 741.3, 745.2; 248/49, 248/56

See application file for complete search history.

(56) References Cited

U.S. PATENT DOCUMENTS

| 3,056,852 | A | * | 10/1962 | Sachs ........................ 174/153 G |
| 3,366,356 | A | * | 1/1968 | Fisher ............................. 248/56 |
| 3,562,847 | A | * | 2/1971 | Jemison ........................... 16/2.1 |
| 3,572,770 | A | * | 3/1971 | Kagi ........................... 285/136.1 |
| 4,188,003 | A | * | 2/1980 | Ramsey .......................... 248/56 |
| 4,192,477 | A | | 3/1980 | Decky et al. |
| 4,864,684 | A | * | 9/1989 | Gellenthin, Jr. ................. 16/2.1 |
| 4,905,940 | A | | 3/1990 | Luka |
| 5,145,273 | A | * | 9/1992 | Hellon et al. ................... 403/24 |
| 5,352,055 | A | * | 10/1994 | Hellon et al. ................... 403/24 |
| 5,360,188 | A | | 11/1994 | Condon |
| 5,374,017 | A | * | 12/1994 | Martin et al. ................... 248/56 |
| 5,488,198 | A | | 1/1996 | Kramer |
| 5,537,714 | A | | 7/1996 | Lynch, Jr. et al. |
| 5,594,209 | A | * | 1/1997 | Nattel et al. .................. 174/660 |
| 5,595,453 | A | | 1/1997 | Nattel et al. |
| 5,627,342 | A | | 5/1997 | Kramer |
| 5,628,087 | A | | 5/1997 | Gretz |
| 5,702,076 | A | | 12/1997 | Humber |
| 6,241,199 | B1 | | 6/2001 | Ismert |
| 6,460,638 | B1 | | 10/2002 | Strunsee et al. |
| 6,598,835 | B2 | * | 7/2003 | Minnick .......................... 248/56 |
| 7,093,858 | B1 | * | 8/2006 | Russell ........................... 285/28 |
| 7,222,394 | B2 | | 5/2007 | Gardner |
| 2007/0251168 | A1 | | 11/2007 | Turner |

* cited by examiner

*Primary Examiner* — Basil Katcheves  
*Assistant Examiner* — Beth Stephan  
(74) *Attorney, Agent, or Firm* — Strategic Patents, P.C.

(57) ABSTRACT

In embodiments of the present invention improved capabilities are described for a protective device for use with a metal stud. This invention protects in-wall piping, conduit and wiring from inadvertent puncturing by drywall screws during the installation of wall boarding.

13 Claims, 12 Drawing Sheets

PROTECTIVE ASSEMBLY FOR IN-WALL PIPING, CONDUIT, AND WIRING

CROSS-REFERENCE TO RELATED APPLICATIONS

This application is a continuation-in-part of the following U.S. patent application, which is incorporated by reference in its entirety: U.S. patent application Ser. No. 11/445,905, filed Jun. 2, 2006.

BACKGROUND

1. Field

The present invention relates to conduit protection devices and more particularly, relates to conduit protective devices for use with metal studs and the like.

2. Description of the Related Art

The use of metal studs has recently become increasing popular in both commercial and residential construction projects. A typical metal stud 1, FIG. 1, features a central region 2 from which two legs 3, 4 generally, outwardly, and perpendicularly extend. The legs 3, 4 generally have a distance D1 that is less than the distance D2 of the central region 2 (typically about ⅓ the distance) and often include regions 5, 6 that extend perpendicularly inwards and towards each other which substantially increase the overall strength of the metal stud 1. Together, the central region 2 and the legs 3, 4 define a central cavity or channel 7.

In practice, the metal stud 1 is generally placed longitudinally upright with a wall structure and the face of the wall (for example sheet rock, plywood, planks, or the like) are secured against one of the outer faces 8 of the legs 3, 4 using screws 9 (typically self-piercing metal "speed screws" or the secured against one of the outer faces 8 of the legs 3, 4 using screws 9 (typically self-piercing metal "speed screws" or the like) as is well known in the construction industry. These screws 9 generally extend into the cavity 7.

During construction, it is often necessary to run conduits such as, but not limited to, plumbing and electrical pipes as well as wires (not shown) through apertures 10 disposed within the central region 2 of the metal stud 1. For ease of installation, the apertures 10 and conduits are often placed within the metal studs 1 prior to securing the facing of the wall to the metal stud 1. Unfortunately, if the screws 9 used to secure the facing of the wall to the metal stud 1 are inserted near a conduit or wire, the screw 9 can easily pierce and damage the conduit or wire. Often times, the damage is not detectable until after the wall has been fully constructed. During the installation of drywall, it is not uncommon for a drywall screw to penetrate a water or sanitary waste pipe located within the studwork. When this occurs, a leak forms which may not be readily apparent. Usually, the damage may only be detected after the system is charged for the first time. In other cases, the damage is not discovered until the screw corrodes and becomes dislodged from the piping (which could take up to several years to occur). Locating the source of the leak can be difficult and time consuming, resulting in extensive water damage and repair work. In the event of a gas line puncture, there is considerably more potential for greater damage to occur.

It is known to protect conduits and wires from damage. However, most of the known devices are either intended for wood (and therefore not applicable to metal studs 1) or are expensive, complex and require the user to assemble several different parts using bolts or the like.

Accordingly, what is needed is a protective device that is particularly suited for use with metal studs. The protective device should be inexpensive and easy to use. The protective device should not require specialized tools or require complex assembly.

It is important to note that the present invention is not intended to be limited to a system or method which must satisfy one or more of any stated objects or features of the invention. It is also important to note that the present invention is not limited to the preferred, exemplary, or primary embodiment(s) described herein. Modifications and substitutions by one of ordinary skill in the art are considered to be within the scope of the present invention, which is not to be limited except by the following claims.

SUMMARY

The puncture solution may include two parts: 1. a non-metallic sleeve; and 2. a metallic ring covered by the non-metallic sleeve. When the two parts are assembled together and installed over a pipe, conduit or wire, a protective shield is formed. During the subsequent installation of drywall, screws (or nails) are deflected by the shield around the pipe or wire, thusly preventing damage yet still allowing the screw to join the sheetrock to the stud and fulfilling its intended purpose.

In an aspect of the invention, a protective device for use with a metal stud may include a non-metallic sleeve with an opening disposed along a longitudinal axis of the non-metallic sleeve, wherein the non-metallic sleeve comprises flexible members disposed along the opening, wherein the flexible members have a length that is at least equal to the thickness of the metal stud; a hinge displaced along the opening of the metallic sleeve, wherein the non-metallic sleeve can flex along the hinge to widen a gap in the non-metallic sleeve by pinching two first protrusions of the non-metallic sleeve on either side of the hinge in order to install the non-metallic sleeve on a pipe, conduit, or wire, and a metallic sleeve having an opening that is adapted to fit over the non-metallic sleeve, wherein when a fastener encounters the metallic sleeve, it is deflected by the metallic sleeve. The device may include a snap on the non-metallic sleeve for securing the non-metallic sleeve to the stud. The first protrusions may press against a surface of the stud and prevent rotation of the protective device within the stud. The hinge may be a living hinge. The device may include second protrusions of the non-metallic sleeve that press against a surface of the stud and prevent rotation of the protective device within the stud. The device may further include a stop displaced between the first protrusions that prevents over-stressing the non-metallic sleeve during installation by limiting the range of motion of the non-metallic sleeve when the first protrusions are pinched. The non-metallic sleeve opening may be generally cylindrical. The metallic sleeve may be generally cylindrical. The flexible members may isolate the pipe, conduit, or wire from the metal stud. The non-metallic sleeve may support the pipe, conduit, or wire. The non-metallic sleeve may isolate the pipe, conduit, or wire from the metallic sleeve.

In an aspect of the invention, a metal stud may include at least one hole punched longitudinally through the metal stud, and a protective device displaced in the punched hole, wherein the protective device includes a non-metallic sleeve with an opening disposed along a longitudinal axis of the non-metallic sleeve, wherein the non-metallic sleeve comprises flexible members disposed along the opening, wherein the flexible members have a length that is at least equal to the thickness of the metal stud, a hinge displaced along the opening of the metallic sleeve, wherein the non-metallic sleeve can flex along the hinge to widen a gap in the non-metallic sleeve by pinching two first protrusions of the non-metallic sleeve on either side of the hinge in order to install the non-metallic sleeve into the punched hole, and a metallic sleeve having an opening that is adapted to fit over the non-metallic sleeve, wherein when a fastener encounters the metallic sleeve, it is deflected by the metallic sleeve. The metal stud may further include a snap on the non-metallic sleeve for securing the non-metallic sleeve to the stud. The first protrusions may press against a surface of the metal stud and prevent rotation of the protective device within the metal stud. The hinge may be a living hinge. The metal stud may further include second protrusions of the non-metallic sleeve that press against a surface of the metal stud and prevent rotation of the protective device within the metal stud. The metal stud may further include a stop displaced between the first protrusions that prevents over-stressing the non-metallic sleeve during installation by limiting the range of motion of the non-metallic sleeve when the first protrusions are pinched. The non-metallic sleeve opening and the metallic sleeve opening may be generally cylindrical. The flexible members may isolate a pipe, conduit, or wire from the metal stud. The non-metallic sleeve may isolate a pipe, conduit, or wire from the metallic sleeve.

According to one embodiment, the present invention features a protective device for use with a metal stud having a length, a width and a thickness. The protective device includes a body and a reduced region. The body defines a first passage disposed along a longitudinal axis of the body and has a length that is at least equal to the thickness of the metal stud. The reduced region is disposed proximate a first end of the body and defines a second passageway fluidly coupled to the first passageway. The outer cross-section of the reduced region is smaller than an outer cross-section of the body.

The body preferably includes a shoulder region proximate an interface between the body and the reduced region and has a length that is greater than a length of the reduced region. The outer cross-section of the reduced region is preferably substantially circular. The reduced region may include a tapered and/or threaded outer surface.

The first and the second passageways preferably include a first and a second opening disposed about generally opposite ends of the protective device and are preferably generally cylindrical. The body and the reduced region also preferably substantially enclose the first and the second passageways.

According to another embodiment, the present invention features a protective device for use with an aperture in a metal stud having a length, a width and a thickness. The protective device includes a body, a reduced region, and a passageway disposed along a longitudinal axis of the protective device. The body has a length that is at least equal to the thickness of the metal stud and the reduced region is disposed proximate a first end of the body and includes an outer cross-section that is smaller than an outer cross-section of the body. The passageway includes a first and a second opening disposed about generally opposite ends of the protective device.

According to yet a further embodiment, the present invention features a protective device including means for securing to the protective device within an aperture disposed in a central region of a metal stud, means for extending through the thickness of the metal stud, the means having an outer cross-section that is larger than the aperture in the metal stud, and a passageway disposed along a longitudinal axis of the protective device, the passageway having a first and a second opening disposed about generally opposite ends of the protective device.

These and other systems, methods, objects, features, and advantages of the present invention will be apparent to those skilled in the art from the following detailed description of the preferred embodiment and the drawings. All documents mentioned herein are hereby incorporated in their entirety by reference.

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

BRIEF DESCRIPTION OF THE FIGURES

The invention and the following detailed description of certain embodiments thereof may be understood by reference to the following figures.

DETAILED DESCRIPTION

Figure 1:
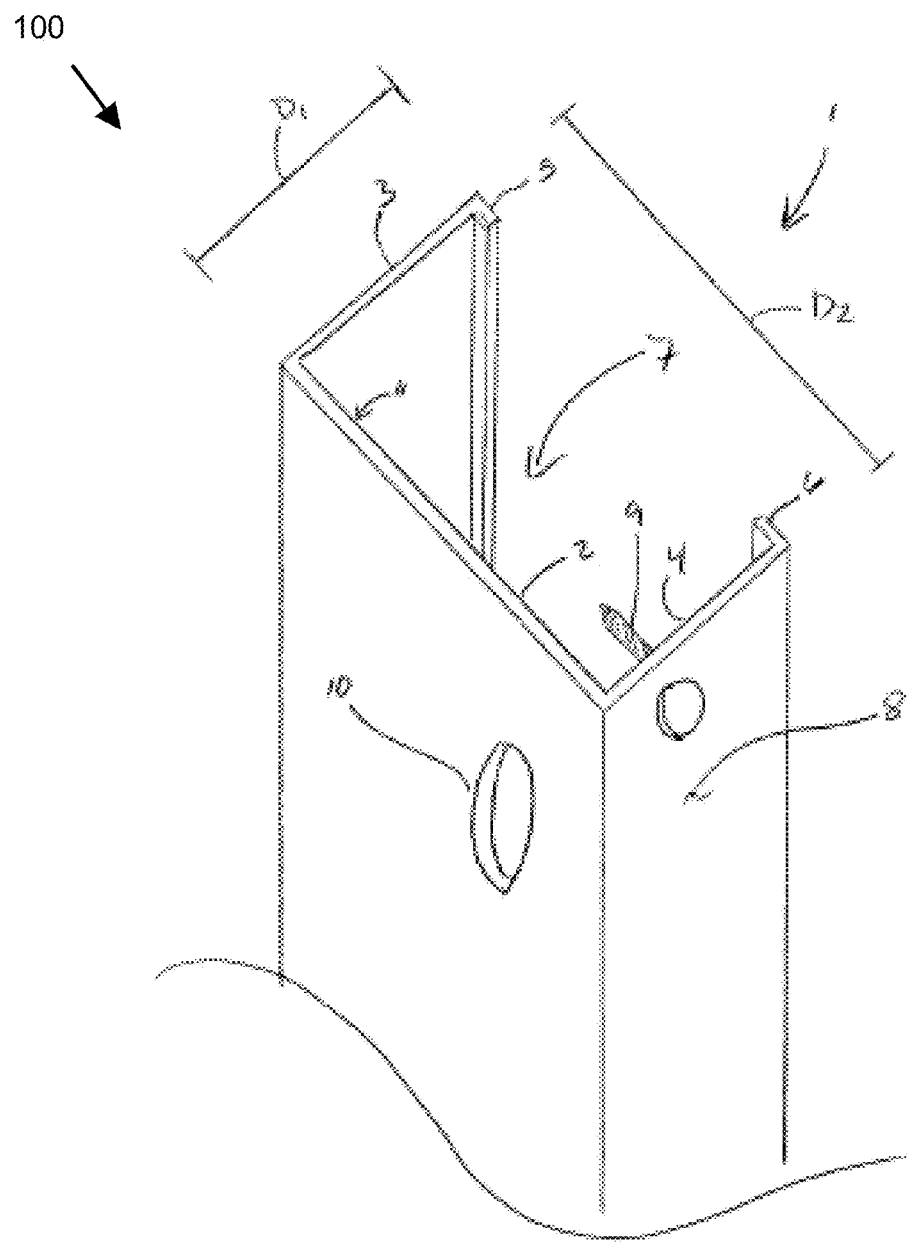
FIG. 1 is an end perspective view of one embodiment of a typical prior art metal stud.
Figure 2:
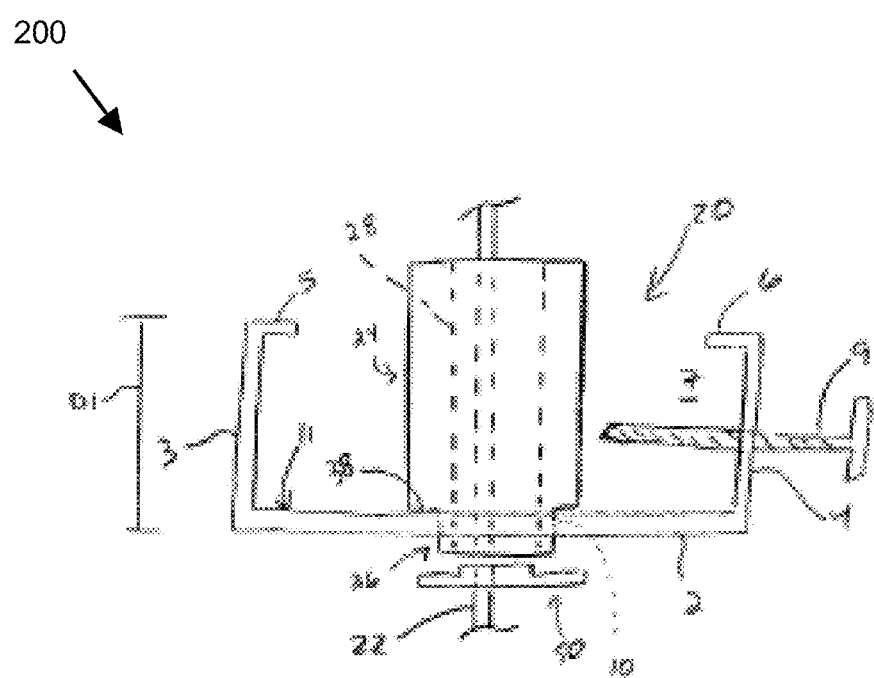
FIG. 2 is a top end perspective view of one embodiment of the protective device according to the present invention in combination with a metal stud.

A protective device 20, FIG. 2, is particularly suited for protecting a conduit (such as, but not limited to, an electrical or fluid conduit) or wire 22 disposed through an aperture 10 in a metal stud 1 (as described above) from damage from a screw 9. In the preferred embodiment, the aperture 10 is disposed in the central region 2, though this is not a limitation of the present invention and the aperture 10 may be disposed through the legs 3, 4. The protective device 20 preferably features a body 24 that includes a reduced region 26 and a passageway 28 the extends through the body 24.

As used wherein, the thickness of the metal stud is intended to be the length of the metal stud 1 which the protective device 20 passes through. More specifically, in the embodiment wherein the protective device 20 is disposed within an aperture 10 in the central region 2, the thickness is defined to be the length D1 of the legs 3, 4.

Figure 3:
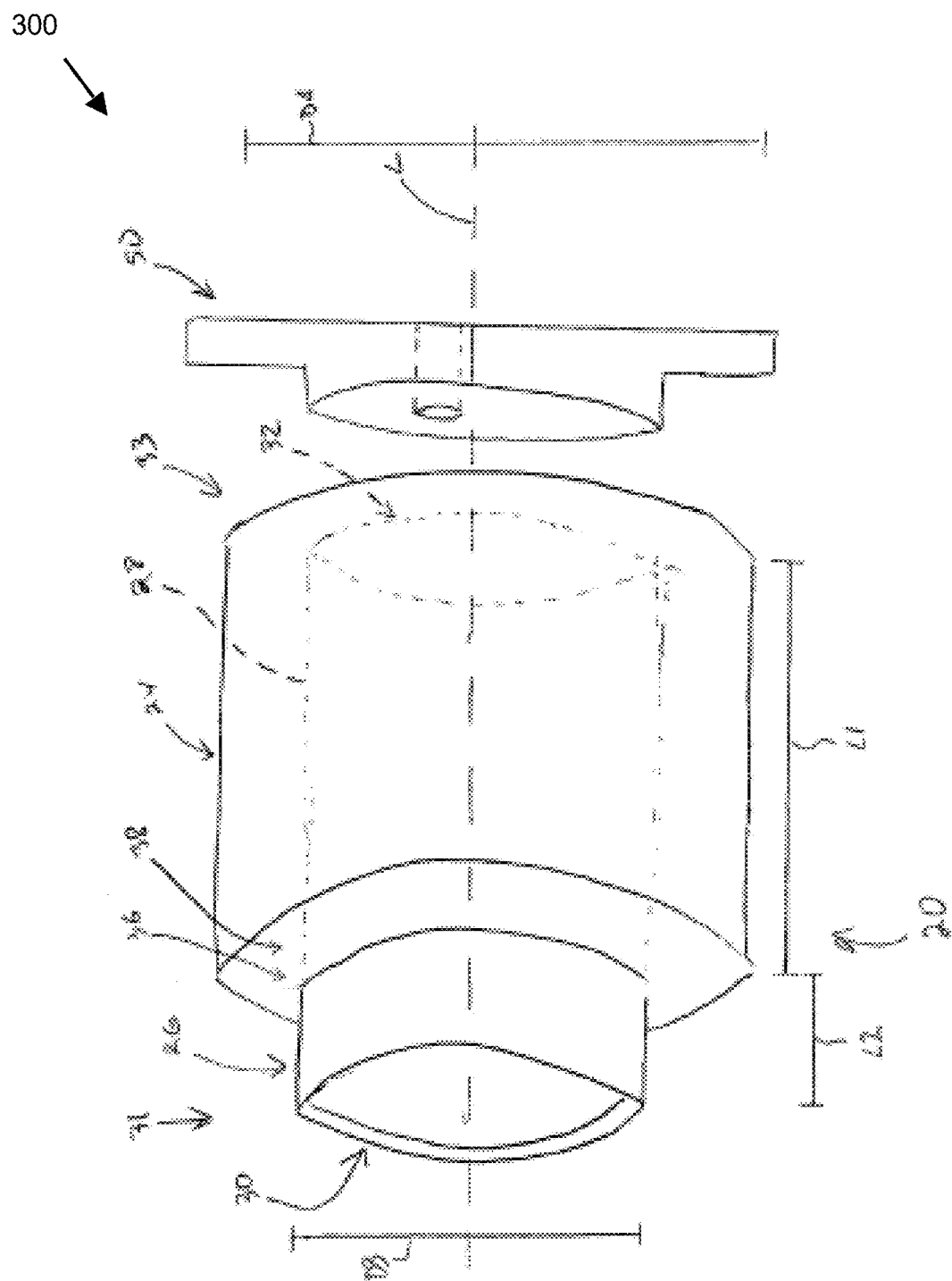
FIG. 3 is a side perspective view of one embodiment of the protective device according to the present invention.

Referring specifically to FIG. 3, the passageway 28 preferably extends along a longitudinal axis L of the protective device 20 and includes a first and at least a second opening 30, 32 disposed about generally opposite ends 31, 33 of the protective device 20. The body 24 of the protective device 20 preferably features a length L1 that is equal to or greater than the thickness of the metal stud 1 and is preferably constructed from a very hard material such a metal or the like. Because the body 24 extends at least through the thickness of the metal stud 1, any screws 9 that are accidentally inserted proximate the protective device 20 will contact the body 24 which has sufficient hardness to prevent the screw 9 from penetrating the passageway 28. The body 24 preferably has a generally tubular outer cross-section, though the body 24 may include any other shape known to those skilled in the art.

The reduced region 26 preferably has a length L2 that is equal to or greater than the thickness of the aperture 10. In the preferred embodiment, the reduced region 26 has a length L2 that large enough such that the reduced region 26 extends just past the outer surface of the metal stud 1. The length L2 is preferably less than the length L1 of the body 24. A benefit of this arrangement is that less force is required to insert or secure the protective device 20 within the aperture 10 of the metal stud 1. The reduced region 26 also features an outer cross-section D3 that substantially the same as the cross-section of the aperture 10 and is preferably smaller than the outer cross-section D4 of the body 24. The outer cross-section D3 is preferably large enough to generate enough friction with the aperture 10 to hold the protective device 20 within the aperture 10. Optionally, an adhesive, bonding agent, solder, or the like may be used to secure the reduced region 26 within the aperture 10.

Figure 4:
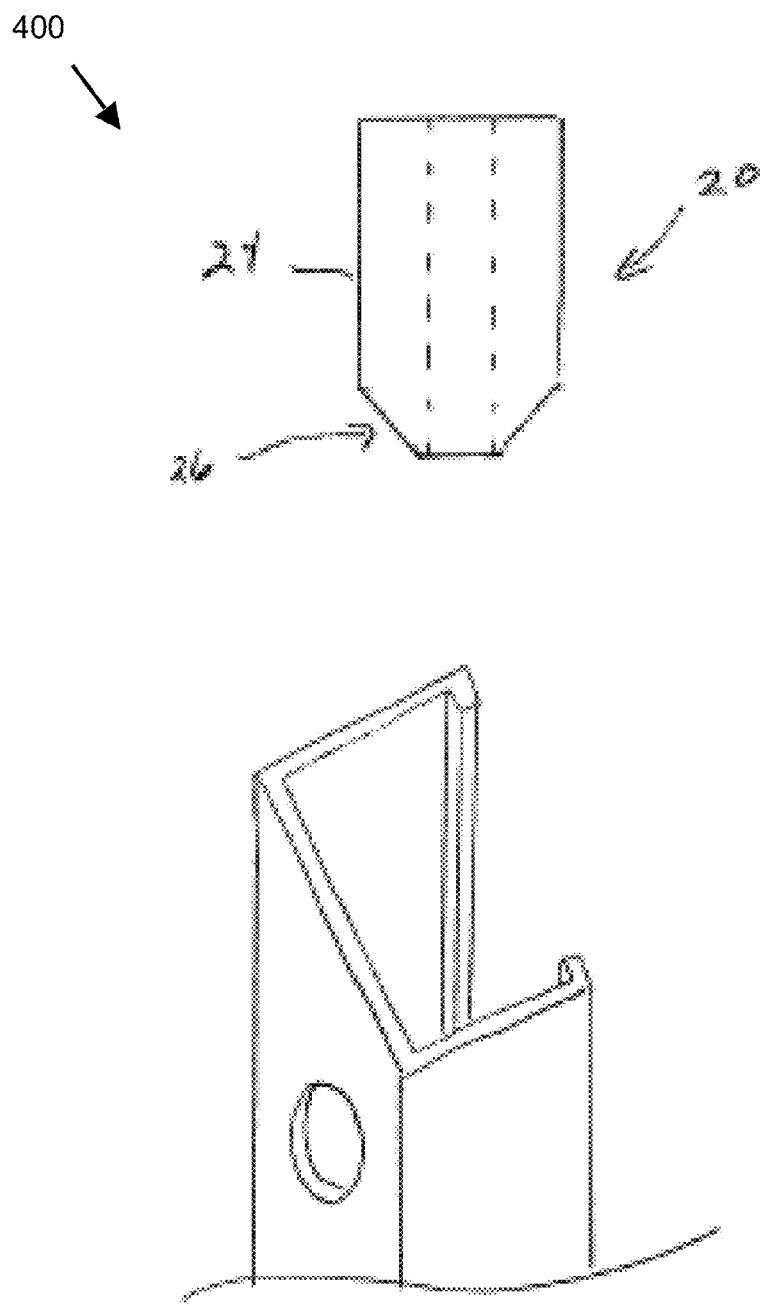
FIG. 4 is a side plan view of another embodiment of the protective device having a tapered reduced region according to the present invention.
Figure 5:
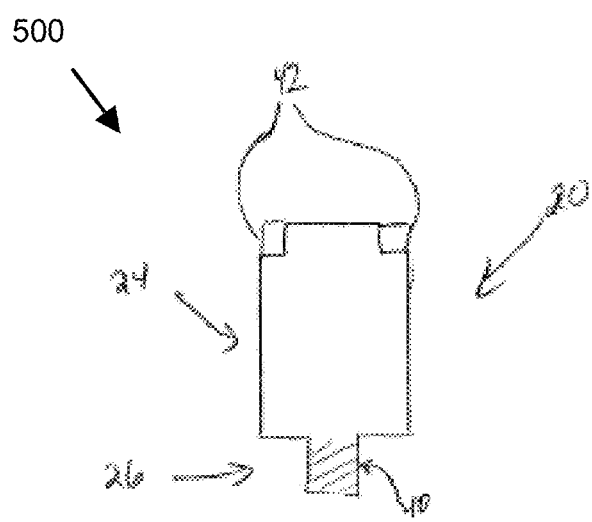
FIG. 5 is a side plan view of another embodiment of the protective device wherein the reduced region includes a threaded outer surface according to the present invention.
Figure 6:
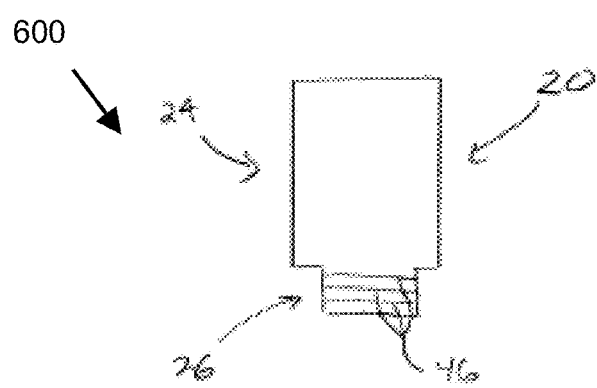
FIG. 6 is a side plan view of another embodiment of the protective device wherein the reduced region includes at least one protrusion or rib according to the present invention.

The reduced region 26 preferably has a generally cylindrical or tubular outer shape. Alternatively, the reduced region 26, FIG. 4, may feature a tapered or conical shape and/or may include a threaded outer surface 40, FIG. 5. In the embodiment wherein the protective device 20 includes a threaded outer surface 40, at least a portion of the body 24 preferably includes a non-cylindrical region 42. The non-cylindrical region 42 preferably features a multi-faceted surface adapted to engage a wrench or the like, and is preferably used to rotate the protective device 20 and thread the reduced region 26 into the aperture 10. According to yet another embodiment, the reduced region 26 may include one or more ribs or protrusions 46 that frictionally engage the aperture 10 when the protective device 20 is inserted within the aperture 10.

The interface 36 between the body 24 and the reduced region 26 preferably forms a rim, shoulder, or flanged region 38. Referring to FIG. 2, the reduced region 26 is inserted into the aperture 10 in the metal stud 1 until the rim 38 is substantially against the inner surface 11 of the metal stud 1, preferably the inner surface 11 of the central region 2. Because the reduced region 26 is disposed within the aperture 10, the body 24 extends through the cavity 7 of the metal stud 1 and through the thickness of the metal stud 1. As discussed above, because the length L2 of the reduced region 26 is approximately the same as the thickness of the aperture 10, the force required to insert/secure the protective device 20 within the metal stud 1 is reduced.

The protective device 20, FIGS. 2 and 3, may optionally include a bushing 50 or the like. The bushing 50 is preferably sized and shaped to fit within the second opening of the passageway 28, though it could also be sized and shaped to fit within the first opening 30. Alternatively, the bushing 50 may be sized and shaped to fit over the ends 31, 33 of the protective device 20. In any event, the bushing 50 preferably positively locates the conduit or wires 22 within the passageway 28 and prevents damage to the conduit/wires 22 and may include any bushing design known to those skilled in the art.

In another embodiment, a protective device 802 may comprise at least two parts: 1. a non-metallic sleeve 1002; and 2. a metallic ring 1004 covered by the non-metallic sleeve. When the two parts are assembled together and installed over a pipe, conduit or wire, a protective shield is formed. During the subsequent installation of drywall, fasteners, such as screws or nails, are deflected by the shield around the pipe or wire, thusly preventing damage yet still allowing the screw to join the sheetrock to the stud and fulfilling its intended purpose. The protective device 802 may comprise a non-metallic isolator 1002, or sleeve, between the pipe and the metal stud with adjustable, centering fingers that may support the pipe. The protective device 802 may snap into the stud to ensure that it stays in place after installation over the pipe or wires. A hardened spring steel sleeve 1004 may deflect a fastener, such as a screw, on contact. The non-metallic sleeve 1002 may have two ears 1010 to help install the protective device 802 around the pipe. The ears 1010 may also ensure that the protective device 802 is installed correctly within the stud and may prevent the rotation of the protective device 802 in such a way as to not expose the opening 1024 in the spring sleeve 1004 to the potential path of a fastener, such as a drywall screw. The protective device 802 may snap over the pipe in a one-handed operation. Stops 1015 on the ears 1010 may prevent over stressing the non-metallic sleeve 1002 during installation. The non-metallic sleeve 1002 may also have two legs 1012 that ensure that the protective device 802 is installed correctly within the stud by preventing the rotation of the unit in such a way as to expose the opening 1024 in the spring sleeve 1004 to the potential path of a fastener.

Figure 7:
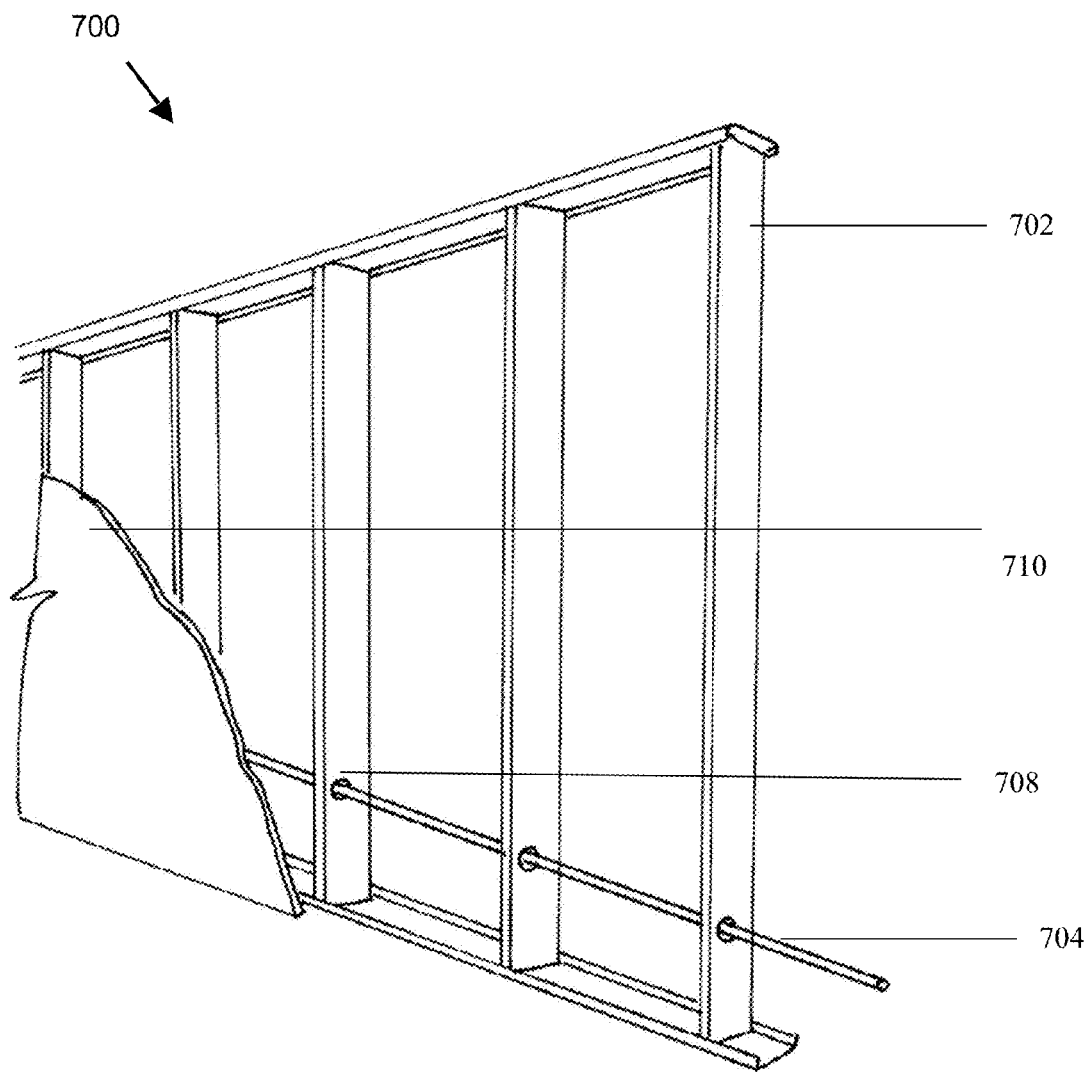
FIG. 7 depicts a typical metal stud wall construction with water and electrical wiring.
Figure 8A:
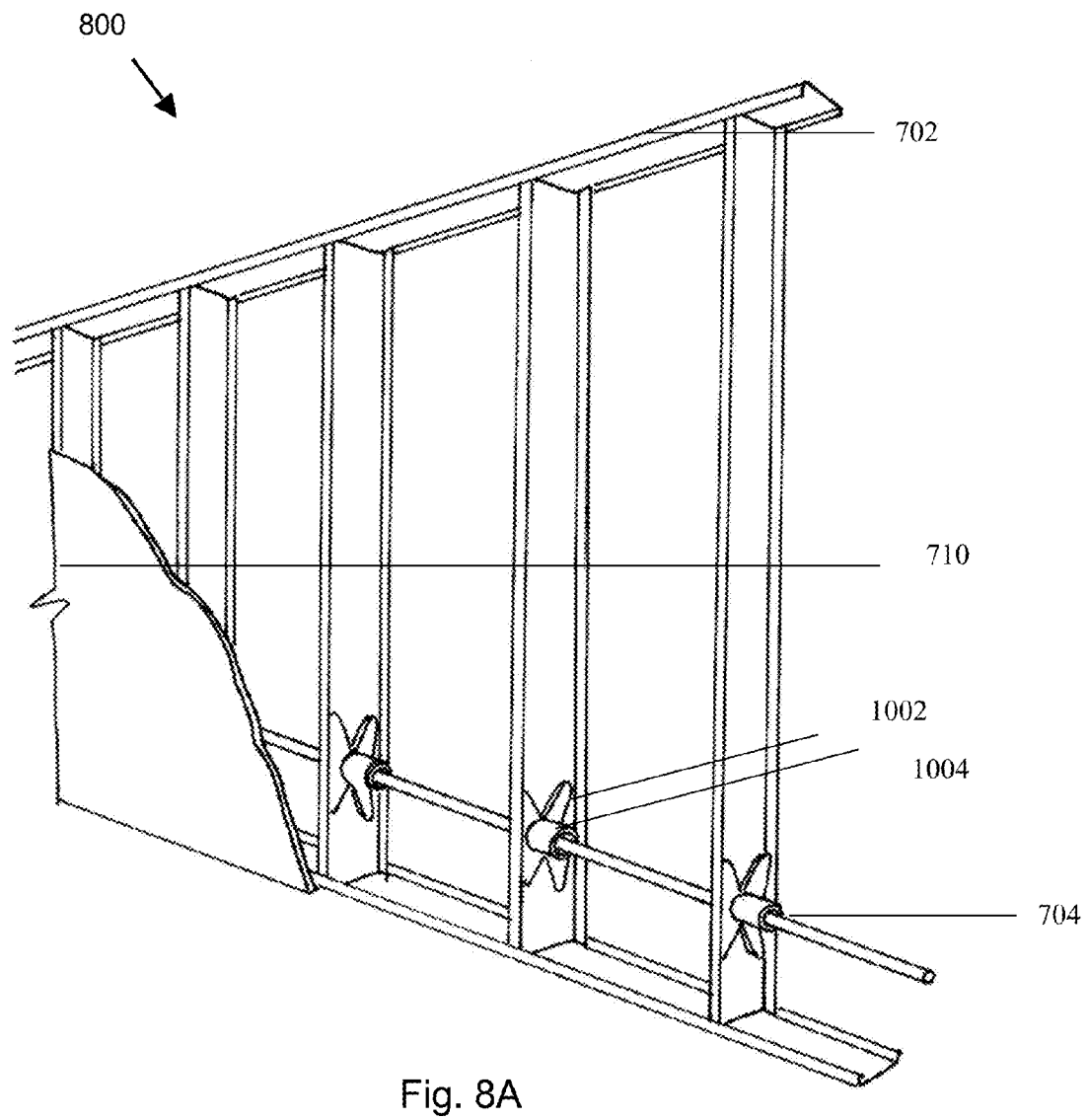
FIG. 8A shows a wall with the puncture solution installed.
Figure 8B:
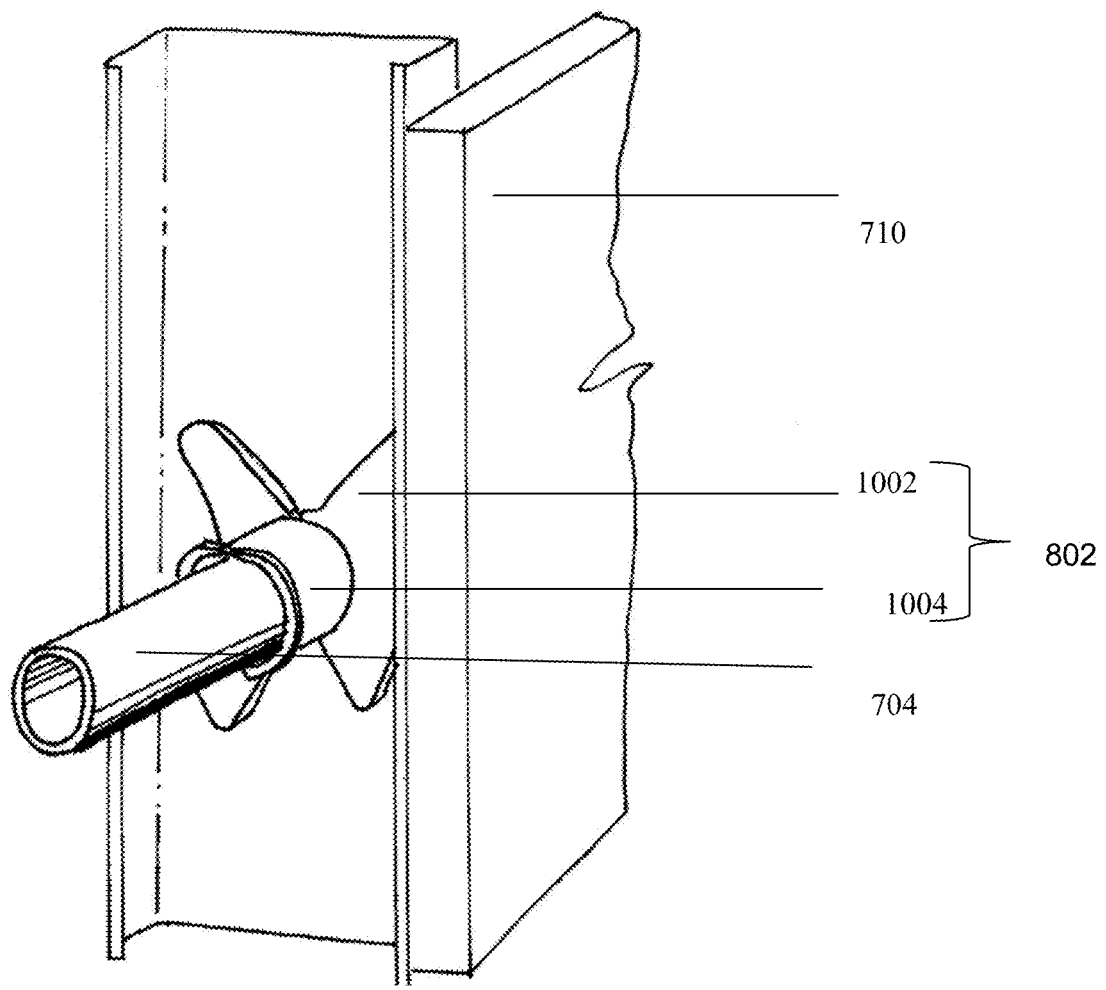
FIG. 8B shows the puncture solution installed into a metal stud.

Referring to FIG. 7, a standard metal stud 702 with a copper water pipe 704 may be installed through punched-out holes 708 in the stud 702. The wall may be finished with sheetrock 710. Referring to FIG. 8A, the wall system is shown with the protective device 802 installed into each of the studs. FIG. 8B shows a close-up view of the protective device 802 snapped into the open "c" section of the metal stud 702 through the punched hole 708.

Figure 9:
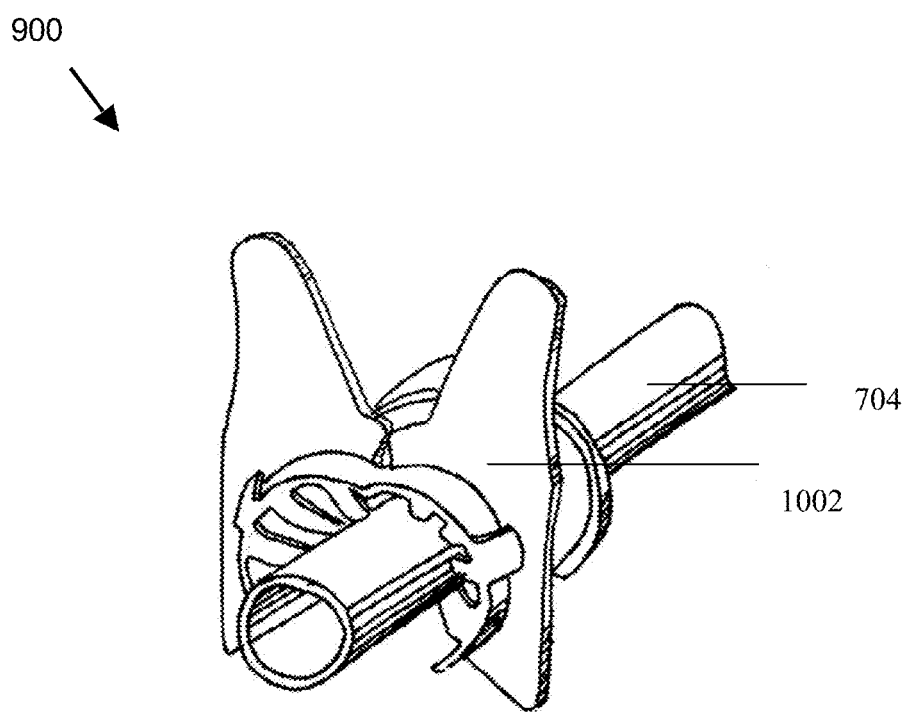
FIG. 9 shows the puncture solution installation.

Referring to FIG. 9, to install the protective device 802, the two ears 1010 may be squeezed together to spread the opening in the non-metallic sleeve. Once the opening is spread, the non-metallic sleeve 1002 may then be placed over the pipe or wire 704.

Figure 10A:
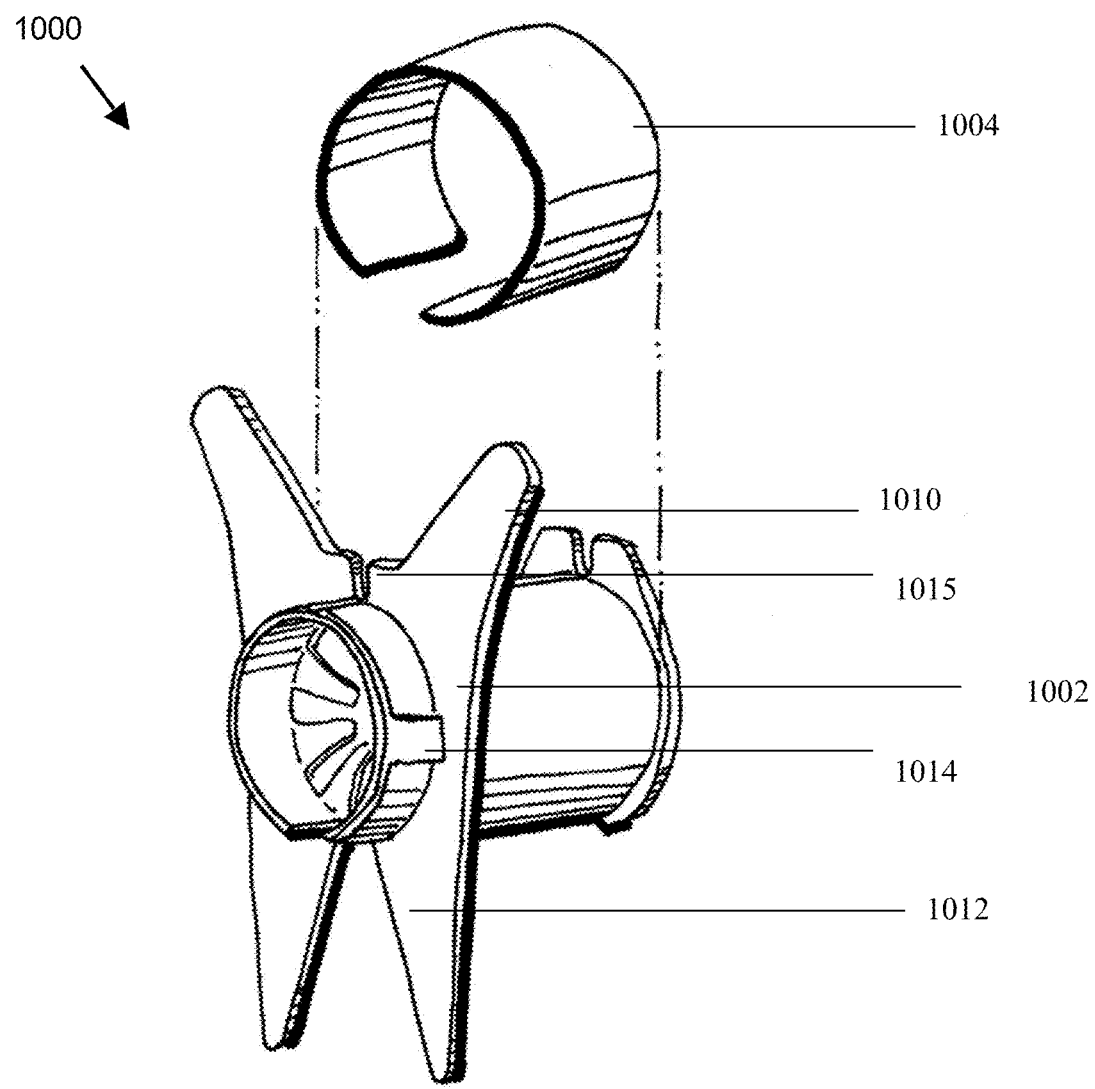
FIG. 10A depicts an exploded view of the puncture solution assembly.

Referring to FIG. 10A, an exploded view shows the two components that make up the protective device 802: the non-metallic sleeve 1002 and the hardened spring sleeve 1004. The non-metallic sleeve 1002 may have the following features: anti-rotation ears 1010, anti-rotation legs 1012 and two flexible snaps 1014 to secure the protective device 802 to the metal stud 702. The ears 1010 may have two stop features 1015 that meet during installation and prevent the non-metallic sleeve 1002 from being over stressed during installation.

Figure 10B:
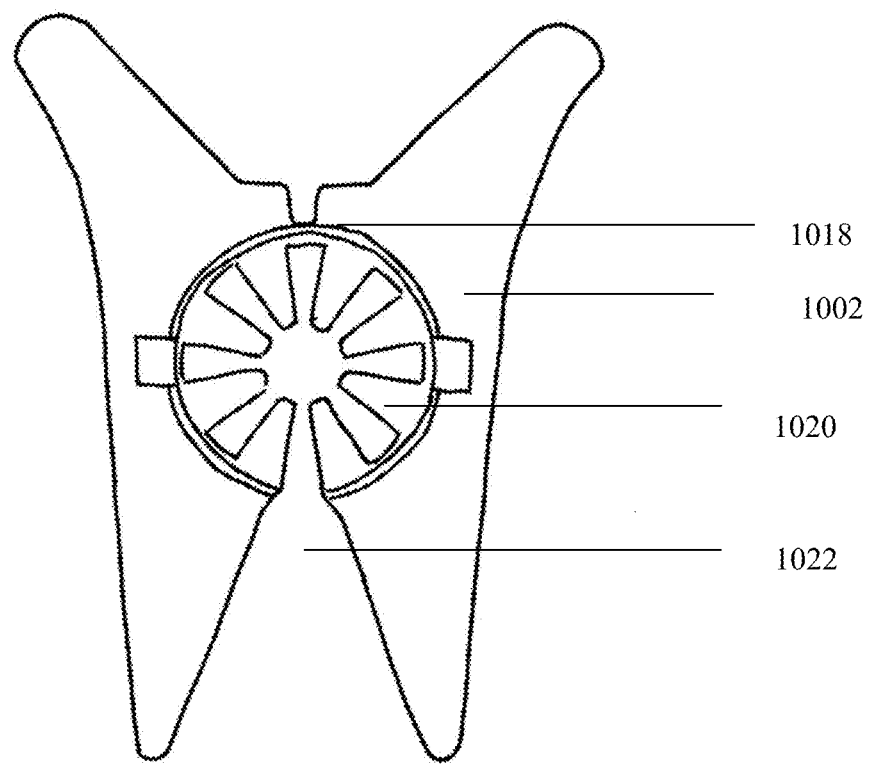
FIG. 10B depicts features of the puncture solution.
Figure 10C:
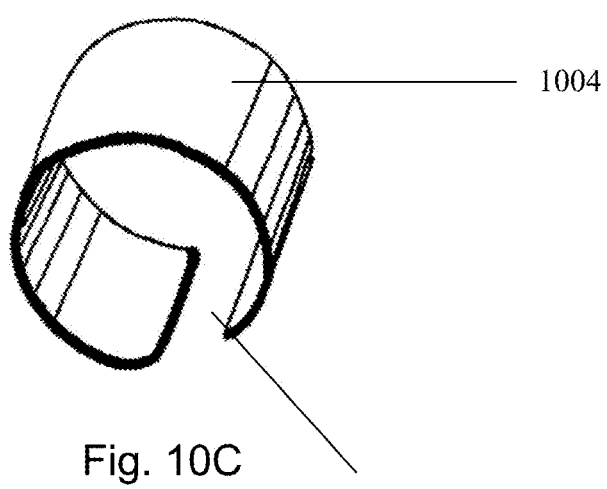
FIG. 10C depicts a spring sleeve of the puncture solution.

Referring to FIG. 10B, a front view of the non-metallic sleeve 1002 shows additional features: a living hinge 1018 and flexible fingers 1020 which are used to support the pipe or wire and isolate the pipe and wire from the metal stud 702. Referring to FIG. 10C, a spring sleeve 1004 may be assembled over the non-metallic sleeve 1002 and prevent the drywall mounting fastener from penetrating the pipe or wires. An opening 1022 in the non-metallic sleeve 1002 enables its placement over a pipe, conduit or wiring.

When the non-metallic sleeve 1002 is placed over the pipe, wire, or conduit, it may be snapped into a punched-out hole 708 in the stud 702. Ears 1010 of the non-metallic sleeve 1002 may be pinched together along the living hinge 1018 until the stops 1015 meet, then the opening 1022 of the non-metallic sleeve 1002 is placed over the pipe, wire, or conduits. When the ears 1010 are released, the non-metallic sleeve 1002 closes around the pipe, wire, or conduit. The ears 1010 and legs 1012 of the sleeve 1002 may prevent rotation of the non-metallic sleeve by pressing against a surface of the stud 702. In embodiments, a snap 1014 may secure the non-metallic sleeve to the stud 702. In embodiments, flexible fingers 1020 may surround the pipe, wire, or conduit opening in the sleeve 1002 and may extend into the punched-out hole 708 in the stud 702, thus providing isolation of the pipe, conduit, or wire from the stud 702. A metallic sleeve 1004 may be placed over the non-metallic sleeve 1002. The non-metallic sleeve 1002 may serve as an isolator between the metallic sleeve 1004 and the pipe, wire, or conduit. The metallic sleeve may provide protection from puncture or penetration by a fastener.

Figures 11A, 11B:
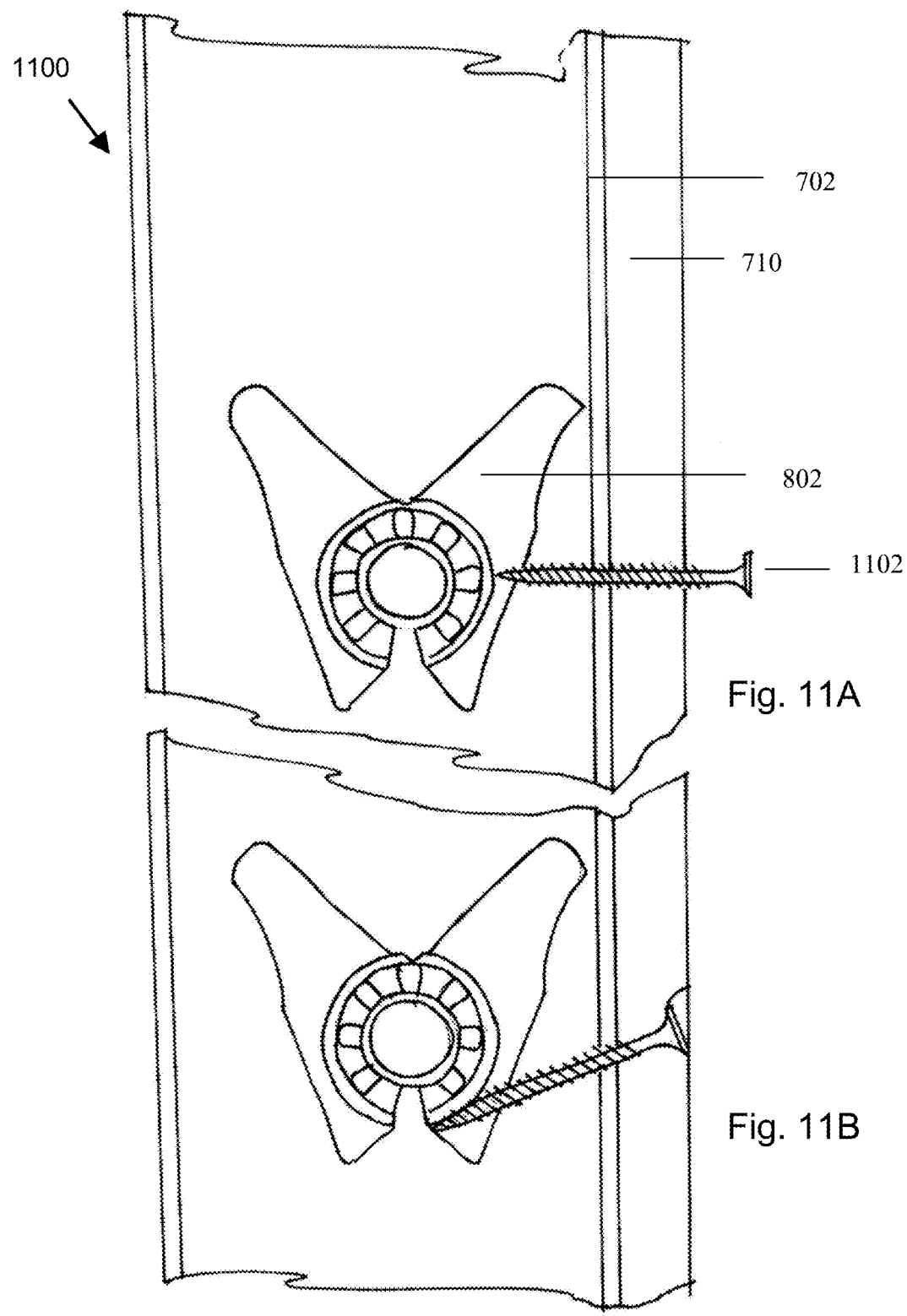
FIG. 11A depicts the puncture solution in use and, in FIG. 11B, a screw deflection.

Referring to FIGS. 11A and 11B, the two states that could occur during driving the wall fastener 1102 are shown. In FIG. 11, the screw 1102 is in the direct path to penetrate the pipe 704. The screw hits the protective device 802 and is deflected by the spring sleeve 1004. FIG. 11B shows the fully driven screw being flush with the drywall 710 and deflected past the pipe, conduit, or wire.

In an embodiment, a protective device for use with a metal stud may include a non-metallic sleeve with an opening disposed along a longitudinal axis of the non-metallic sleeve, wherein the non-metallic sleeve comprises flexible members disposed along the opening, wherein the flexible members have a length that is at least equal to the thickness of the metal stud, a hinge displaced along the opening of the metallic sleeve, wherein the non-metallic sleeve can flex along the hinge to widen a gap in the non-metallic sleeve by pinching two first protrusions of the non-metallic sleeve on either side of the hinge in order to install the non-metallic sleeve on a pipe, conduit, or wire; and a metallic sleeve having an opening that is adapted to fit over the non-metallic sleeve, wherein when a fastener encounters the metallic sleeve, it is deflected by the metallic sleeve. The device may include a snap on the non-metallic sleeve for securing the non-metallic sleeve to the stud. The first protrusions may press against a surface of the stud and prevent rotation of the protective device within the stud. The hinge may be a living hinge. The device may include second protrusions of the non-metallic sleeve that press against a surface of the stud and prevent rotation of the protective device within the stud. The device may further include a stop displaced between the first protrusions that prevents over-stressing the non-metallic sleeve during installation by limiting the range of motion of the non-metallic sleeve when the first protrusions are pinched. The non-metallic sleeve opening may be generally cylindrical. The metallic sleeve may be generally cylindrical. The flexible members may isolate the pipe, conduit, or wire from the metal stud. The non-metallic sleeve may support the pipe, conduit, or wire. The non-metallic sleeve may isolate the pipe, conduit, or wire from the metallic sleeve.

In an embodiment, a metal stud may include at least one hole punched longitudinally through the metal stud, and a protective device displaced in the punched hole, wherein the protective device includes a non-metallic sleeve with an opening disposed along a longitudinal axis of the non-metallic sleeve, wherein the non-metallic sleeve comprises flexible members disposed along the opening, wherein the flexible members have a length that is at least equal to the thickness of the metal stud, a hinge displaced along the opening of the metallic sleeve, wherein the non-metallic sleeve can flex along the hinge to widen a gap in the non-metallic sleeve by pinching two first protrusions of the non-metallic sleeve on either side of the hinge in order to install the non-metallic sleeve into the punched hole, and a metallic sleeve having an opening that is adapted to fit over the non-metallic sleeve, wherein when a fastener encounters the metallic sleeve, it is deflected by the metallic sleeve. The metal stud may further include a snap on the non-metallic sleeve for securing the non-metallic sleeve to the stud. The first protrusions may press against a surface of the metal stud and prevent rotation of the protective device within the metal stud. The hinge may be a living hinge. The metal stud may further include second protrusions of the non-metallic sleeve that press against a surface of the metal stud and prevent rotation of the protective device within the metal stud. The metal stud may further include a stop displaced between the first protrusions that prevents over-stressing the non-metallic sleeve during installation by limiting the range of motion of the non-metallic sleeve when the first protrusions are pinched. The non-metallic sleeve opening and the metallic sleeve opening may be generally cylindrical. The flexible members may isolate a pipe, conduit, or wire from the metal stud. The non-metallic sleeve may isolate a pipe, conduit, or wire from the metallic sleeve.

Accordingly, the present invention features a protective device that is particularly suited for use with metal studs. The protective device is inexpensive and easy to use and does not require specialized tools or require complex assembly.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A method for protecting an object installed through a hole in a stud having a web and a pair of parallel spaced legs, comprising:
    providing a first sleeve having a longitudinal length extending along a longitudinal axis of the first sleeve, the first sleeve having a flexible hinge therein extending along the length thereof, the first sleeve including a plurality of members disposed on an inner periphery thereof and upper and lower protrusions disposed on an outer periphery thereof;
    opening the first sleeve along the flexible hinge;
    placing the first sleeve over the object, the members of the first sleeve surround the object, wherein the object is installed in a building prior to placing the first sleeve, and wherein the object includes at least one of a pipe, a conduit, and a wire;
    fastening the first sleeve to the stud with the upper and lower protrusions positioned between and pressing against the stud legs, wherein the upper and lower protrusions extend beyond the first sleeve to prevent rotation of the first sleeve with respect to the stud;
    providing a rigid second sleeve having a longitudinal length extending along a longitudinal axis of the second sleeve, an opening formed along the length of the second sleeve; and
    placing the second sleeve over the first sleeve with the opening in the second sleeve positioned between the lower protrusions of the first sleeve, wherein the upper and lower protrusions prevent the rotation of the combined first sleeve and second sleeve within the stud, and wherein the second sleeve shields the first sleeve and the installed object from penetration by a foreign object.

2. The method of claim 1, wherein the first sleeve includes a non-metallic sleeve.

3. The method of claim 1, wherein the second sleeve includes a metallic sleeve.

4. The method of claim 1, wherein the hinge is a living hinge.

5. The method of claim 1, further comprising using a protrusion of the first sleeve to press against a surface of the stud to prevent rotation of the first sleeve within the stud.

6. The method of claim 5, wherein the first sleeve is opened using a mechanism including a plurality of protrusions.

7. The method of claim 1, wherein the first sleeve includes an opening that is generally cylindrical.

8. The method of claim 1, wherein the second sleeve is generally cylindrical.

9. The method of claim 1, wherein the members isolate the object from the metal stud.

10. The method of claim 1, wherein the first sleeve supports the object.

11. The method of claim 1, wherein the first sleeve isolates the object from the second sleeve.

12. The method of claim 3, wherein the members disposed on the inner periphery are flexible.

13. The method of claim 6, further comprising using a stop disposed between the plurality of protrusions that prevents over-stressing the first sleeve during installation by limiting the range of motion of the first sleeve when the plurality of protrusions are used to open the first sleeve.

* * * * *

UNITED STATES PATENT AND TRADEMARK OFFICE
CERTIFICATE OF CORRECTION

| | | |
|---|---|---|
| PATENT NO. | : 8,424,267 B2 | Page 1 of 1 |
| APPLICATION NO. | : 12/562696 | |
| DATED | : April 23, 2013 | |
| INVENTOR(S) | : Vincent F. Cannistraro et al. | |

It is certified that error appears in the above-identified patent and that said Letters Patent is hereby corrected as shown below:

In the Claims:

Column 10, Line 10, "12. The method of claim 3, wherein the members disposed" should read
-- 12. The method of claim 1, wherein the members disposed --

Signed and Sealed this
Twenty-fifth Day of June, 2013

Teresa Stanek Rea
*Acting Director of the United States Patent and Trademark Office*